United States Patent [19]
Ori

[11] Patent Number: 6,023,353
[45] Date of Patent: Feb. 8, 2000

[54] METHOD OF DESIGNING A SPATIAL PHASE MODULATION ELEMENT AND A SPATIAL PHASE MODULATION ELEMENT

[75] Inventor: Yuichiro Ori, Moriyama, Japan

[73] Assignee: Minolta Co., Ltd., Osaka, Japan

[21] Appl. No.: 09/181,516

[22] Filed: Oct. 28, 1998

[30] Foreign Application Priority Data

Oct. 30, 1997 [JP] Japan ................................. 9-298389
Oct. 30, 1997 [JP] Japan ................................. 9-298390

[51] Int. Cl.$^7$ ............................ G03H 1/08; G02B 1/28
[52] U.S. Cl. ................................. 359/9; 359/24; 359/576
[58] Field of Search .............................. 359/9, 24, 576, 359/29, 4; 349/201

[56] References Cited

U.S. PATENT DOCUMENTS 5,790,023  8/1998  Hobbs et al. ........................... 359/576

FOREIGN PATENT DOCUMENTS 5-307188  11/1993  Japan .
5-323110  12/1993  Japan .
6-148412   5/1994  Japan .
6-222383   8/1994  Japan .

Primary Examiner—Jon Henry
Attorney, Agent, or Firm—Sidley & Austin

[57] ABSTRACT

A method of designing a spatial phase modulation element which has a plurality of hologram surfaces with mutually different phase patterns, and a spatial phase modulation element produced in the method. The spatial phase modulation element is designed to have a variable-phase medium located on one side of each of the hologram surfaces and modulating means for modulating the phase patterns of the hologram surfaces independently of each other. Further, if the number of output patterns to be obtained with the spatial phase modulation element is n and if the number of hologram surfaces is N, the spatial phase modulation element is so designed as to meet the condition $n \geq N+2$, $N \geq 2$. In other words, the method of designing such a spatial phase modulation element has the following steps of: determining the number of hologram surfaces according to the number of desired output patterns; determining the number of phase values according to the shapes of the desired output patterns and forming phase patterns; coding each of the phase patterns into a binary digit string; optimizing each of the coded phase patterns independently of each other; and forming a combination pattern by combining the independently optimized phase patterns and optimizing the combination pattern.

14 Claims, 23 Drawing Sheets

F I G. 7
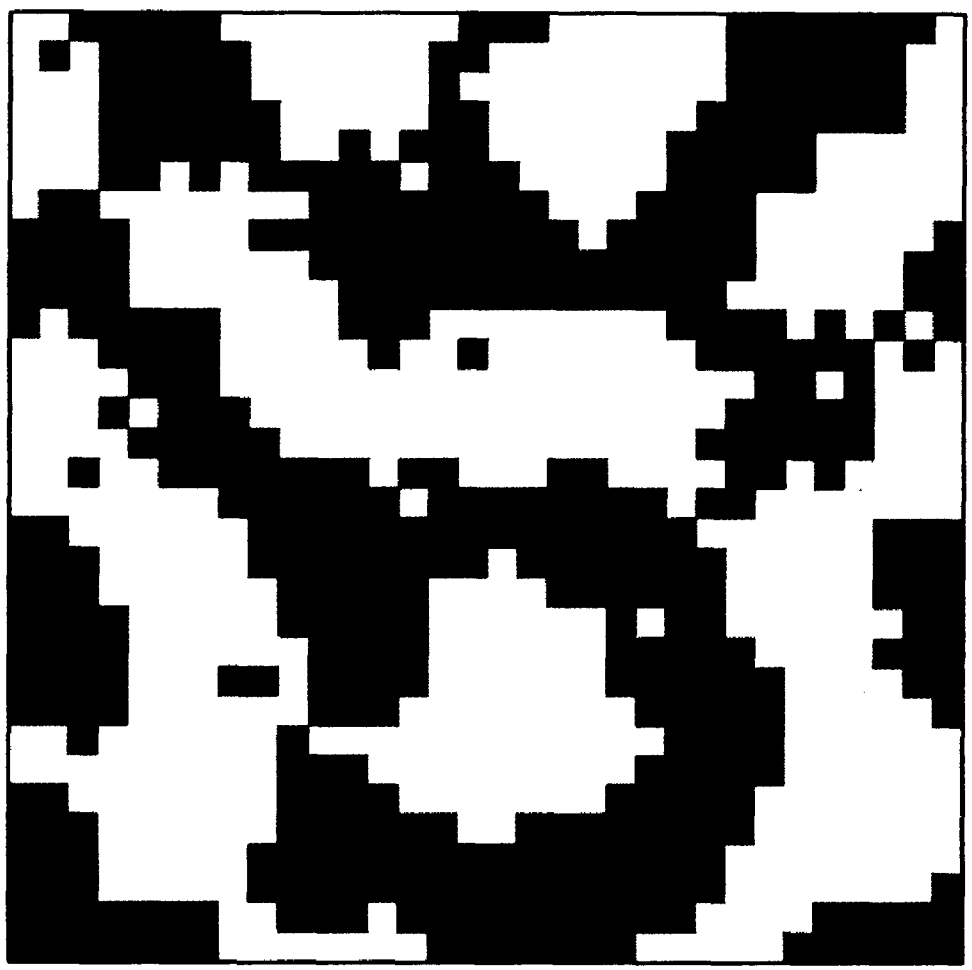

F I G. 8
F I G. 9
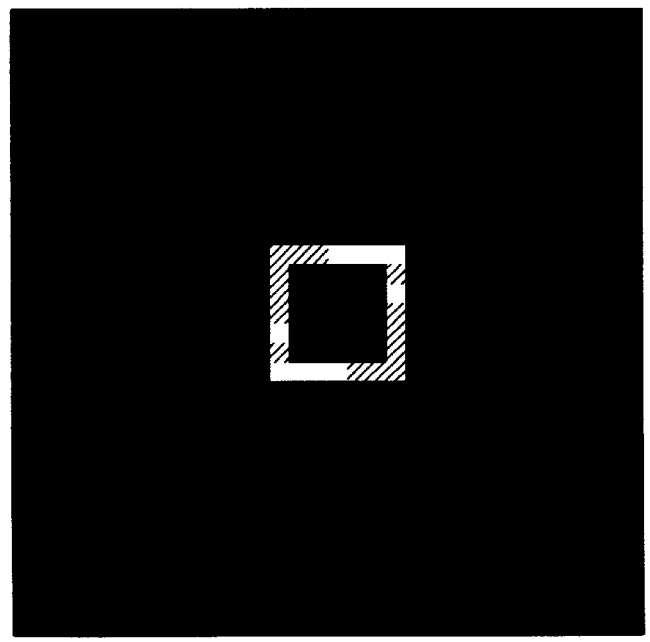

F I G. 1 0
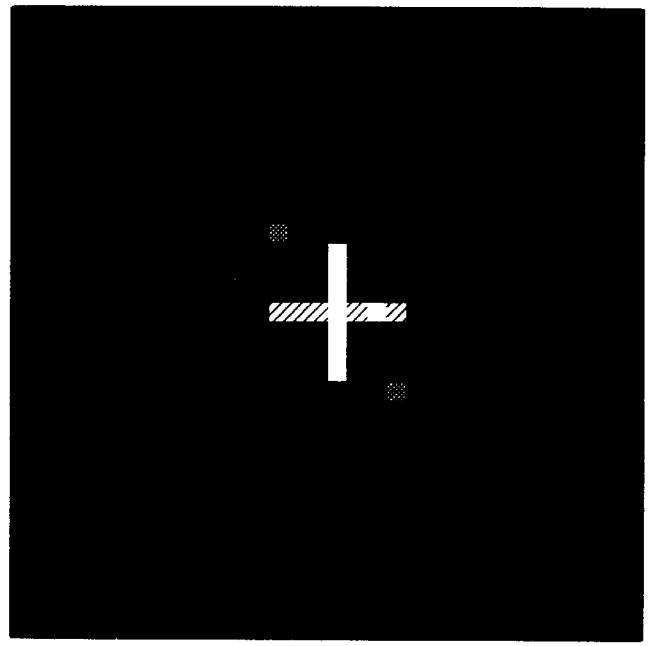
F I G. 1 1
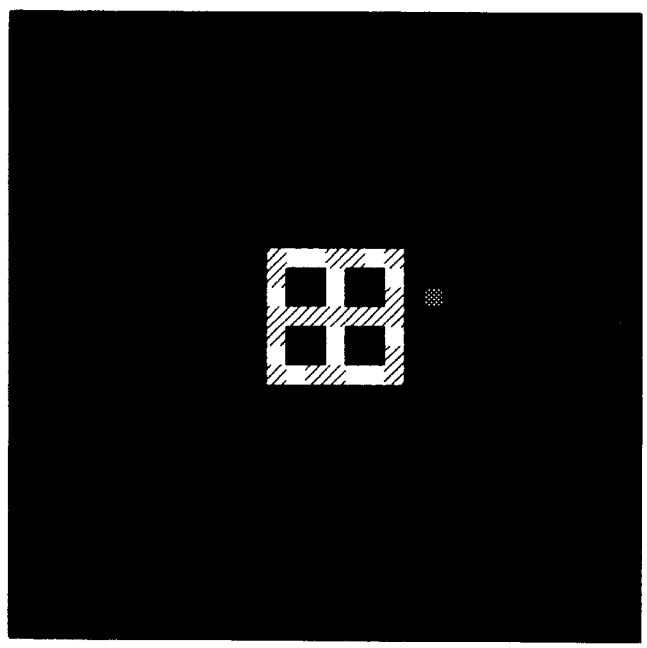

F I G. 15
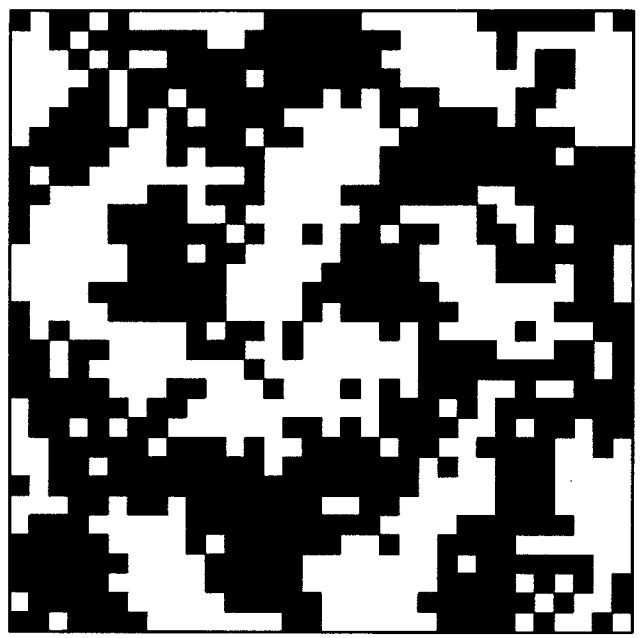
F I G. 16

F I G. 17
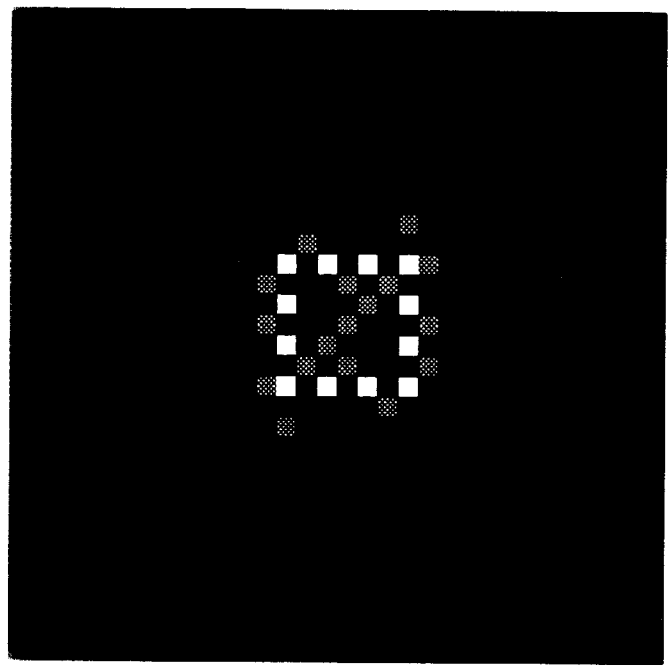
F I G. 18
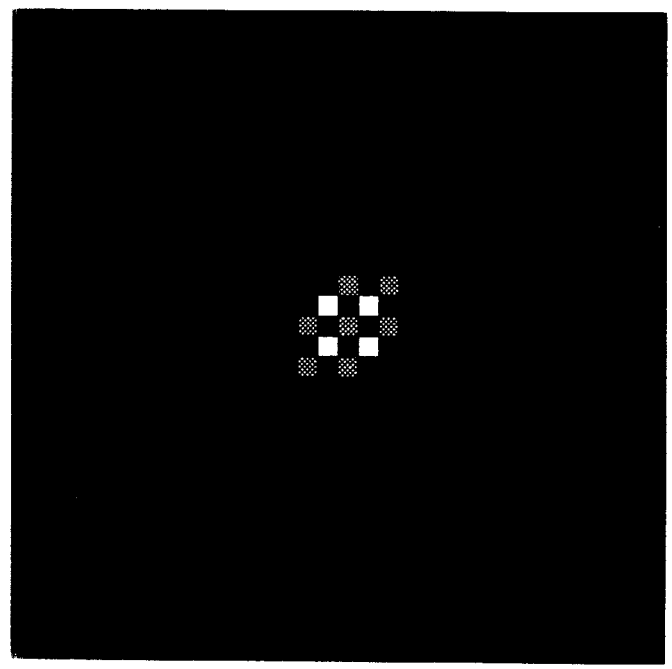

F I G. 19
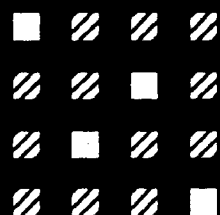

F I G. 23
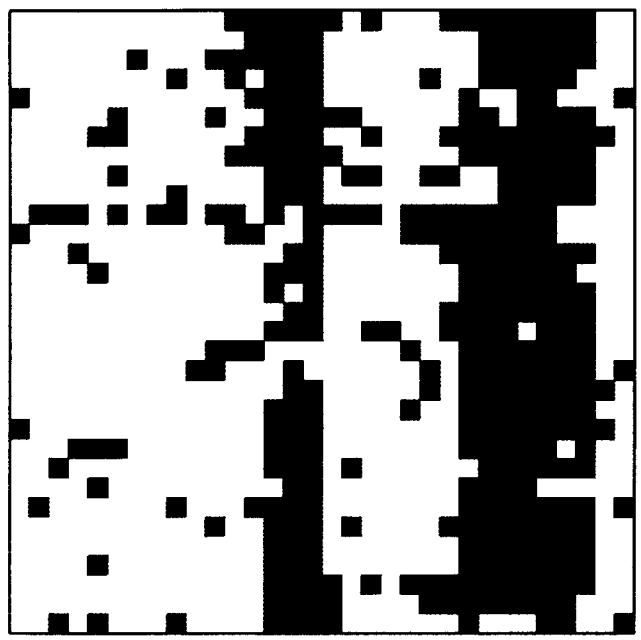
F I G. 24

F I G. 3 1
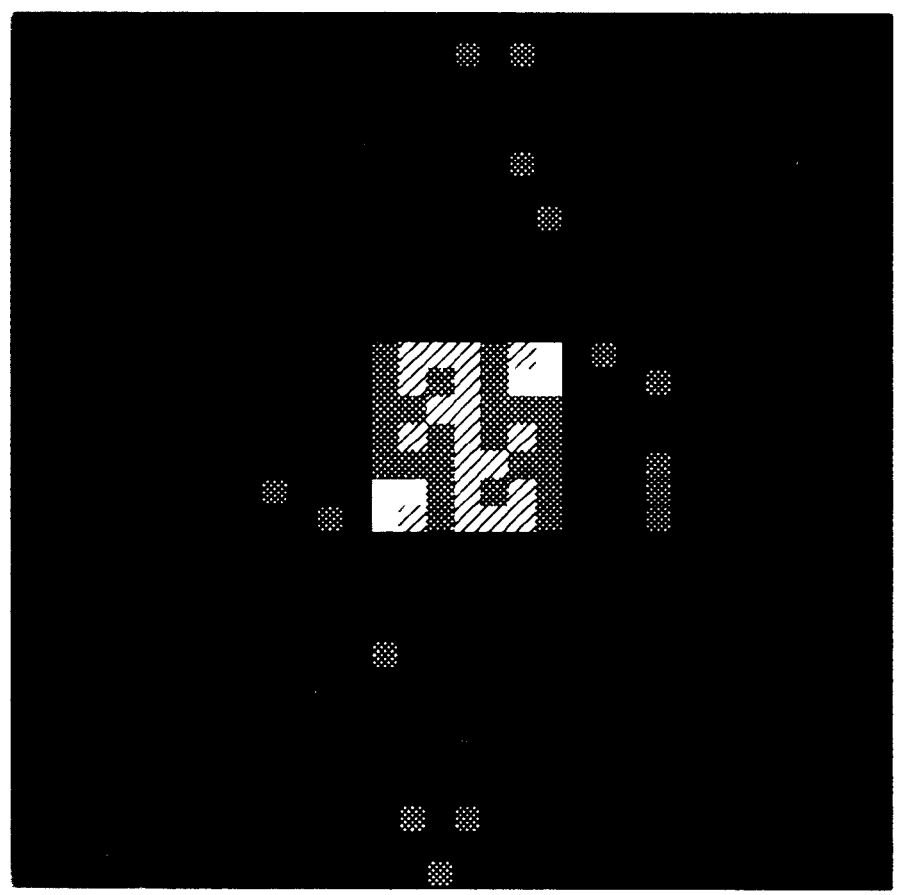

METHOD OF DESIGNING A SPATIAL PHASE MODULATION ELEMENT AND A SPATIAL PHASE MODULATION ELEMENT

This application is based on applications No. 9-298389 and No. 9-298390 filed in Japan, the contents of which are hereby incorporated by reference.

BACKGROUND OF THE INVENTION

1. Field of the Invention

The present invention relates to a method of designing a spatial phase modulation element and a spatial phase modulation element, and more particularly to a spatial phase modulation element which has a hologram surface and is used for a phase filter, a laser beam shaping device, an optical interconnector, an optical switch, an optical computer, an optical measuring device or the like and a method of designing such a spatial phase modulation element.

2. Description of Prior Art

Conventionally, it is known that optical elements using diffraction are used as optical elements for shaping a laser beam and for diving a laser beam into a plurality of beams. For example, Japanese Patent Laid Open Publication No. 5-323110 proposed an optical element for dividing a laser beam into a plurality of beams.

Also, an optical element which has a variable-index medium (a medium of which refractive index is variable) and a medium with a diffraction surface (hologram surface) is known. The diffraction surface (hologram surface) is located in the interface between the variable-index medium and a nonvariable-index medium (a medium of which refractive index is not variable). This optical element turns on and off its diffraction function by modulating the refractive index of the variable-index medium. More specifically, in such an optical element, generally, when the refractive index of the variable-index medium becomes substantially equal to that of the medium with a diffraction surface (hologram surface), the diffraction function is lost and turned off. Conversely, when the refractive index of the variable-index medium is different from that of the medium with a diffraction surface (hologram surface), the diffraction function is effected and turned on. The modulation of the refractive index is carried out by applying a voltage to the variable-index medium, supplying a current to the medium, heating the medium or the like.

A conventional hologram element using a variable-index medium generates a new pattern designed by a computer when the diffraction function is on and does not generate any new patterns when the diffraction function is off. In this case, with one hologram surface, outputs of two patterns, an output pattern which is the same as an input pattern and an output pattern which is newly generated from an input pattern, are possible.

Conventionally, in order to switch the output of a hologram element between a plurality of output patterns, the same number of hologram surfaces as the number of patterns to be generated are prepared, and the hologram surface to be used is switched between the plurality of hologram surfaces. For example, Japanese Patent Laid Open Publication No. 6-148412 disclosed that two diffraction elements using liquid crystal are laminated and that by switching the elements to be turned on and off, an optical switch, a vari-focus lens or the like can be obtained.

It is more known that by employing a spatial optical modulation element using liquid crystal or the like, any desired hologram surface can be formed, and any desired output pattern can be obtained. In a spatial optical modulation element using liquid crystal, each picture element can be modulated independently, and any desired hologram surface can be formed. However, since each pixel of liquid crystal is of an electrode structure, it is required to have dimensions in a certain extent (in an extent of 30 $\mu$m), and when liquid crystal is used for a hologram, a limit must be set to the diffraction angle. Moreover, in order to drive the pixels independently of each other, confusing electrode patterns and a complex control circuit are necessary.

On the other hand, when a plurality of hologram surfaces which were prepared beforehand are switched, the number of possible output patterns depends on the number of the hologram surfaces. Accordingly, in order to generate a large number of output patterns, the number of necessary hologram surfaces is largely increased. In a case wherein a plurality of laminated hologram elements are turned on and off independently of each other to generate a plurality of output patterns, conventionally, the hologram surfaces are designed independently, and only (N+1) output patterns can be generated. Here, N is the number of hologram surfaces. If two or more hologram elements are turned on simultaneously, the output pattern obtained at this time is the one caused by phase modulation by the hologram surfaces of the turned-on hologram elements. However, since each hologram surface is designed independently to generate a desired output pattern, a pattern caused by phase modulation by a plurality of hologram surfaces is out of shape and is different from the desired output pattern. Further, one of the (N+1) output patterns is the same as inputted, and the other N patterns are newly generated patterns.

SUMMARY OF THE INVENTION

An object of the present invention is to provide a spatial phase modulation element and a designing method thereof which can obtain more desired output patterns without increasing the number of hologram surfaces.

In order to attain the object, a method of designing a spatial phase modulation element according to the present invention comprises the steps of designing a plurality of hologram surfaces with mutually different phase patterns; designing a variable-phase medium to be located on one side of each of the hologram surfaces; and designing modulating means for modulating the phase patterns of the hologram surfaces independently of each other, and when the modulating means is operated, the following condition is fulfilled:

$n \geq N+2$ $N \geq 2$ wherein, n is the number of patterns to be outputted from the spatial phase modulation element, and N is the number of hologram surfaces.

A spatial phase modulation element designed and produced in the above method is capable of turning on and off the functions of the hologram surfaces independently of each other by controlling the hologram surfaces with the modulating means. The spatial phase modulation element can output patterns not less than N+2 and not more than $2^N$.

The method of designing a spatial phase modulation element further comprises a first step of designing and optimizing phase patterns independently to achieve desired output patterns; and a second step of designing and optimizing a combination pattern by combining the phase patterns optimized in the first step.

In this method, since phase patterns are optimized independently to achieve respective output patterns beforehand, in designing a combination pattern by combining the phase patterns, only small changes to the phase patterns are necessary. Accordingly, design of a combination pattern is easy.

BRIEF DESCRIPTION OF THE DRAWINGS

This and other objects and features of the present invention will be apparent from the following description with reference to the accompanying drawings, in which:

FIG. 7 is a plan view of a first example of a first phase pattern of the spatial phase modulation element;

FIG. 8 is a plan view of a first example of a second phase pattern of the spatial phase modulation element;

FIG. 9 is a plan view of an output pattern which is obtained when only a hologram surface with the first phase pattern shown by FIG. 7 operates;

FIG. 10 is a plan view of an output pattern which is obtained when only a hologram surface with the second phase pattern shown by FIG. 8 operates;

FIG. 11 shows an output pattern which is obtained when both the hologram surfaces with the first phase pattern shown by FIG. 7 and with the second phase pattern shown by FIG. 8 respectively operate;

FIG. 12 shows data values of the output pattern shown by FIG. 9;

FIG. 13 shows data values of the output pattern shown by FIG. 10;

FIG. 14 shows data values of the output pattern shown by FIG. 11;

FIG. 15 is a plan view of a second example of the first phase pattern of the spatial phase modulation element;

FIG. 16 is a plan view of a second example of the second phase pattern of the spatial phase modulation element;

FIG. 17 is a plan view of an output pattern when only the hologram surface with the first phase pattern shown by FIG. 15 operates;

FIG. 18 is a plan view of an output pattern when only the hologram surface with the second phase pattern shown by FIG. 16 operates;

FIG. 19 is a plan view of an output pattern when both the hologram surfaces with the first phase pattern shown by FIG. 17 and with the second phase pattern shown by FIG. 18 respectively operate;

FIG. 20 shows data values of the output pattern shown by FIG. 17;

FIG. 21 shows data values of the output pattern shown by FIG. 18;

FIG. 22 shows data values of the output pattern shown by FIG. 19;

FIG. 23 is a plan view of a third example of the first phase pattern of the spatial phase modulation element;

FIG. 24 is a plan view of a third example of the second phase pattern of the spatial phase modulation element;

FIG. 28 shows data values of the output pattern shown by FIG. 25;

FIG. 29 shows data values of the output pattern shown by FIG. 26;

FIG. 30 shows data values of the output pattern shown by FIG. 27; and

FIG. 31 is for comparison with the third example and is a plan view of an output pattern which is generated by simultaneous operation of a hologram surface with a first phase pattern and a hologram surface with a second phase pattern, the first and second phase patterns being optimized independently of each other.

DETAILED DESCRIPTION OF THE PREFERRED EMBODIMENTS

Figure 1:
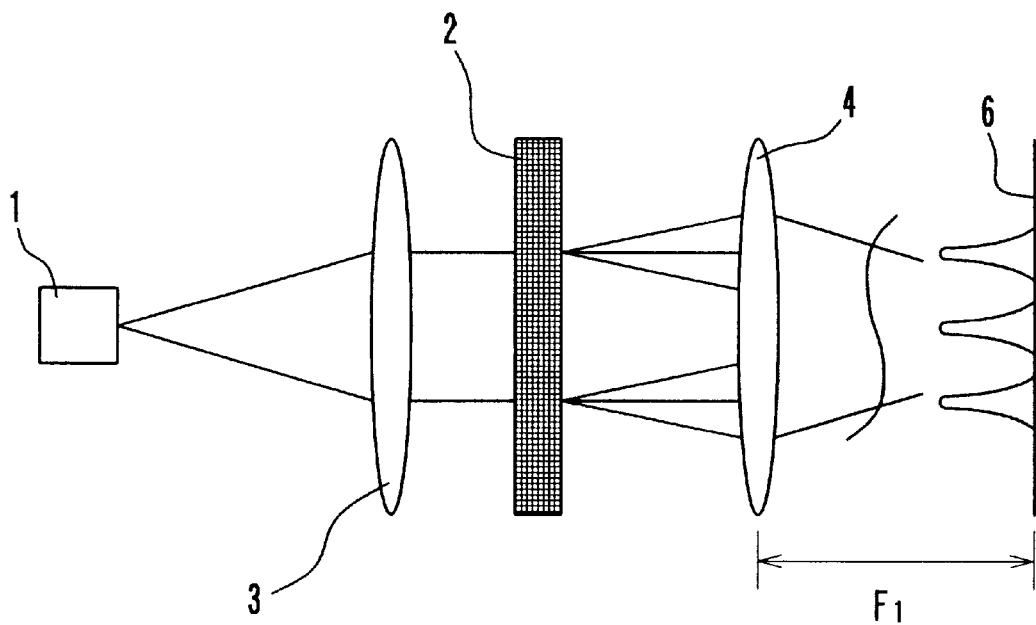
FIG. 1 is a schematic view of a hologram device employing a spatial phase modulation element according to the present invention.

An embodiment of the present invention is hereinafter described referring to the accompanying drawings.

A sampling theory is used for design of hologram surfaces to generate desired output patterns. Specifically, an output pattern to be generated is deemed to be composed of finite discrete points, and the phases at these points are handled as mutually independent parameters. An output pattern generated on a Fourier surface depends on the amplitudes of Fourier functions on the respective points, and the phases on the respective points are used as parameters in designing a hologram surface.

A hologram surface is composed of a plurality of sub-cells, and each sub-cell is composed of N×M pixels. In this embodiment, N=M=32. With respect to a phase type computer hologram used in this embodiment, the phases of the N×M pixels are optimized so that a desired output pattern can be generated on a Fourier surface. A hologram surface of a spatial phase modulation element is a matrix of such sub-cells.

In optimizing the phases of the pixels of each sub-cell, generally except simple cases, the solution cannot be figured out analytically. Therefore, various approximate designing methods have been suggested.

A typical example of these approximate designing methods is a Gerchberg-Saxton algorithm or an iteration Fourier method which is one of multidimensional optimal gradient searching methods known as a non-linear optimization theory and was proposed by R. W. Gerchberg and W. O. Saxton (see Optik, 35, 237–246(1972)). Recently, E. G. Johnson et al. proposed a method in which the optimal solution is figured out by using a genetic algorithm (J. Opt. Soc. Am. A, 12, 1152–1160(1995)). Now, the genetic algorithm, which is used as a method of optimizing the phase pattern of a hologram surface in the embodiment below, is briefly described.

The genetic algorithm is a typical algorithm in the field of computer science and is called evolutionary computing. The genetic algorithm is an optimization technique of evolving a candidate of the solution by applying manipulations based on genetic variations and natural selections in the nature to a given problem repeatedly. This is not suitable for every problem. However, generally, the genetic algorithm has a large search space, and this algorithm is effective when the search space is uneven and complex.

In the genetic algorithm, a candidate of the solution is coded. The coding is usually carried out by using a binary digit string with a fixed length. At this time, each bit is called a gene, and a binary digit string is called a chromosome. First, a group of random chromosomes are generated. Natural selections and genetic manipulations such as crossing-over, mutations, etc. are applied to the group, and a new group is generated.

Generating a new group is called alternation of generations. The crossing-over is similar to recombination of genes in the nature and is to make a partial exchange between two chromosomes. The mutation is to change a gene partly at random. Each of the chromosomes is evaluated with respect to fitness to the solution to be attempted, and chromosomes with high grades in fitness are selected from the group. Then, manipulations are applied so that the selected chromosomes will generate more offspring. Optimization by using the genetic algorithm is to figure out an optimal solution in the search space by repeating alternation of generations.

FIG. 1 shows a hologram device. The hologram device is composed mainly of a laser source 1, a spatial phase modulation element 2, a collimator lens 3 and a Fourier-transform lens 4. A laser beam emitted from the laser source 1 is changed into a parallel bundle of rays by the collimator lens 3 and then is incident to the spatial phase modulation element 2 with a computer hologram surface. The laser beam which has been subjected to phase modulation in the spatial phase modulation element 2 is emergent therefrom and passes the Fourier-transform lens 4. Then, the laser beam is imaged on a focal point of the Fourier-transform lens 4 (with a focal length $F_1$) and forms a desired output pattern on a Fourier surface 6.

Although the Fourier-transform lens 4 is used in this embodiment, it is possible to give a focusing function to the spatial phase modulation element 2 itself. In this case, the Fourier-transform lens 4 is not necessary. Specifically, a phase ΦL with a lens function expressed by the following expression is applied to a phase function to be figured out, and optimization is carried out.

$$\Phi L = -i \times \pi \times (x^2 + y^2)/(\lambda F_2)$$

Here, $\lambda$ is a designed wavelength, and $F_2$ is a focal length.

Figure 2:
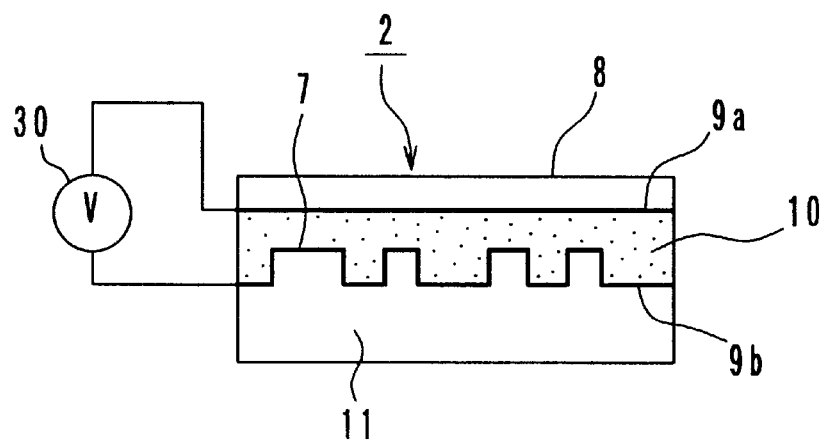
FIG. 2 is an illustration showing the principle of operation of a spatial phase modulation element.

As FIG. 2 shows, the spatial phase modulation element 2 is a laminate of a substrate 11, a phase modulation medium 10, a glass cover 8 and transparent electrodes 9a and 9b. As the phase modulation medium 10, liquid crystal, PLZT or the like is used. In this embodiment, liquid crystal whose refractive index is variable (nematic liquid crystal, ferro-electric liquid crystal or the like) is used. The transparent electrodes 9a and 9b are made of ITO (indium tin oxide).

On the substrate 11, a hologram surface 7 with a phase pattern is formed. The liquid crystal 10 is filled in a gap between the glass cover 8 and the substrate 11. The transparent electrodes 9a and 9b are located on the interface between the liquid crystal 10 and the glass cover 8 and on the interface between the liquid crystal 10 and the substrate 11, respectively. The refractive index of the substrate 11 is equal to either the ordinary index $n_o$ or the effective index $n_e$ of the liquid crystal 10. When a voltage is applied between the transparent electrodes 9a and 9b from a power source 30, the refractive index of the liquid crystal 10 alters between $n_o$ and $n_e$. With this arrangement, switching of the diffraction function of the hologram surface 7 becomes possible. More specifically, when there is a difference in refractive index between the liquid crystal 10 and the substrate 11, the diffraction function is turned on, and when there becomes no difference in refractive index, the diffraction function is turned off. When the diffraction function is on, the collimated laser beam incident to the element 2 is subjected to phase modulation caused by the pixels of the hologram surface 7, and consequently, a desired output pattern is formed on a place which is at the focal distance $F_1$ from the Fourier-transform lens 4. When the diffraction function is off, the laser beam is not subjected to phase modulation.

Figure 3:
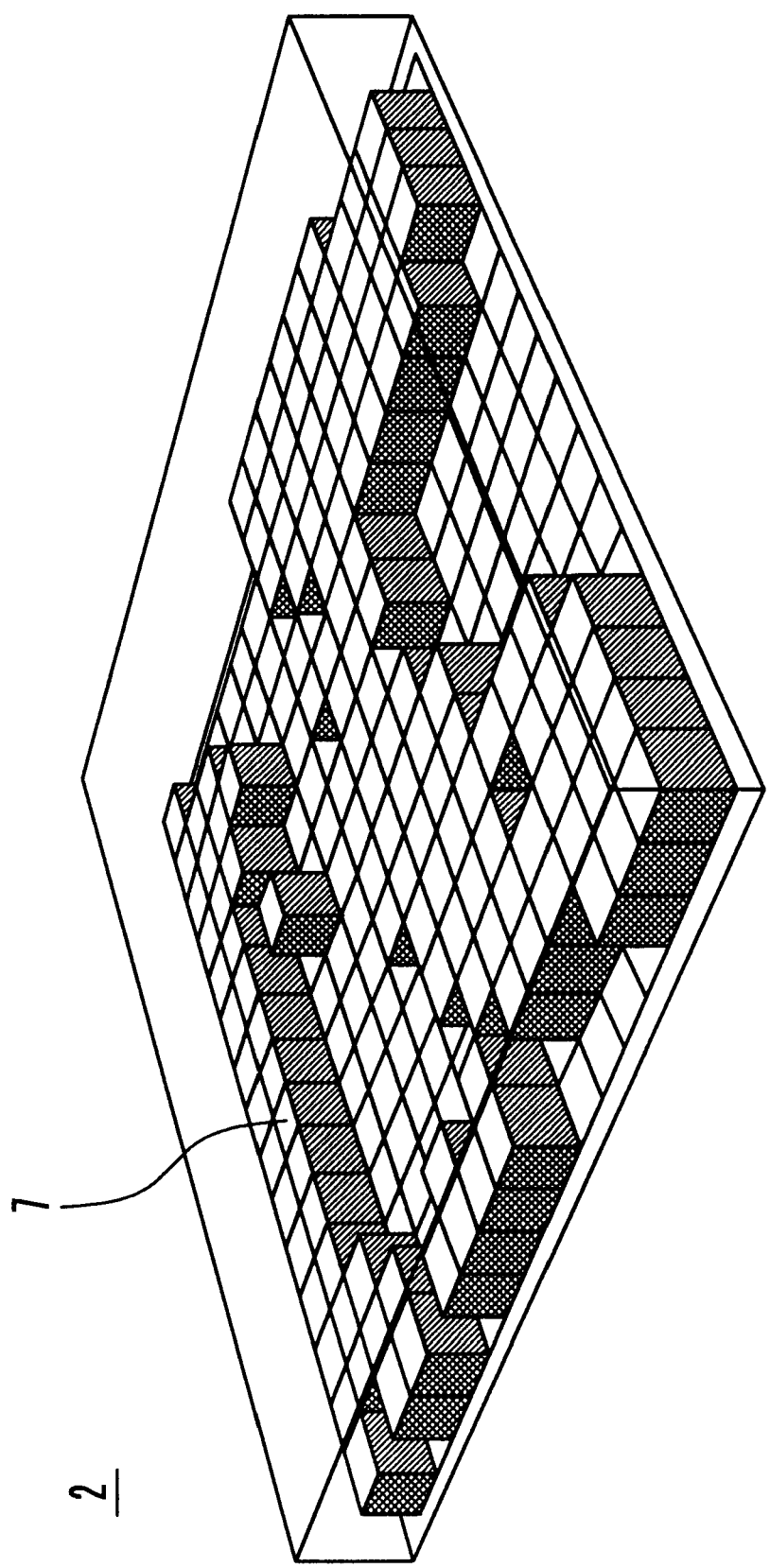
FIG. 3 is a perspective view of a hologram surface of a spatial phase modulation element.

FIG. 3 is a perspective view of the hologram surface 7 of the spatial phase modulation element 2.

Figure 4:
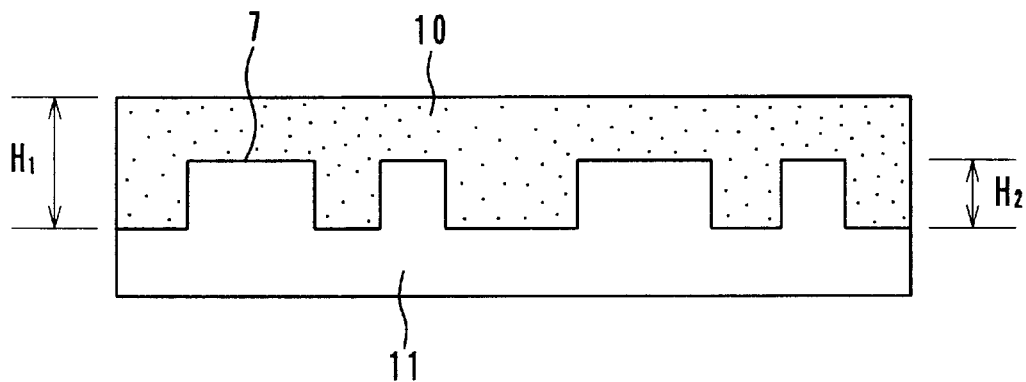
FIG. 4 is a general structural view of a spatial phase modulation element.

FIG. 4 shows the substrate 11 with a designed hologram surface 7 thereon. The liquid crystal 10 has a height $H_1$, and the step of each pixel has a height $H_2$. The height $H_2$ is determined by using the following expression.

$$H_2 = \lambda/(2 \times (n-n'))$$

Here, $\lambda$ is a designed wavelength, n is the refractive index of the substrate 11 on which the hologram surface 7 is formed, and n' is the refractive index of the liquid crystal 10. Further, n is not equal to n', and n' is equal to $n_o$ or $n_e$.

Figure 5:
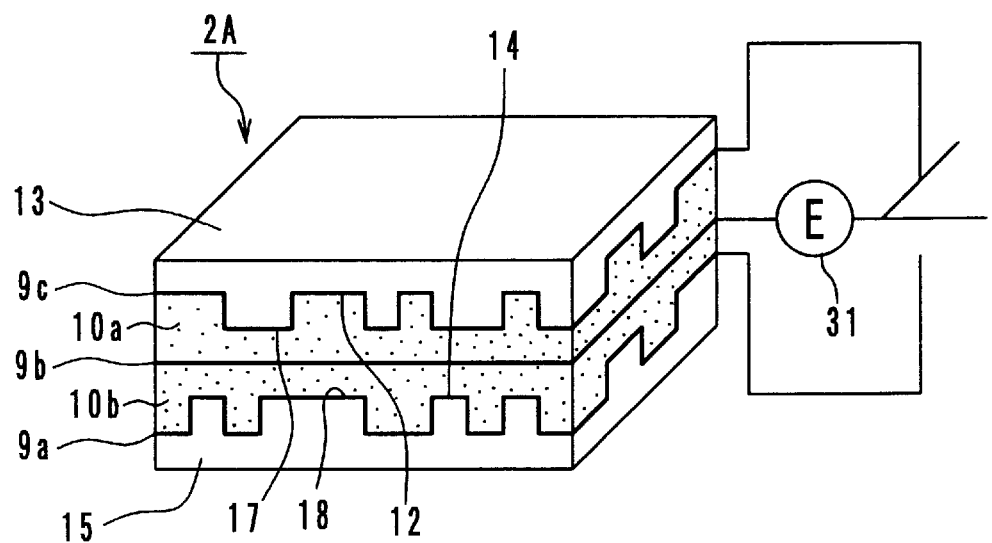
FIG. 5 is a perspective view of a spatial phase modulation element of an embodiment of the present invention.

FIG. 5 shows a spatial phase modulation element 2A with two hologram surfaces. The spatial phase modulation element 2A is a laminate of substrates 13 and 15, a phase modulation medium (liquid crystal) 10a and 10b, and transparent electrodes 9a, 9b and 9c. On the substrate 13, a hologram surface 17 with a first phase pattern is formed. On the substrate 15, a hologram surface 18 with a second phase pattern 14 is formed. The transparent electrodes 9a, 9b and 9c are located on the interface between the substrate 15 and the liquid crystal 10b, on the interface between the liquid crystal 10a and the liquid crystal 10b and on the interface between the substrate 13 and the liquid crystal 10a, respectively. The refractive indexes of the substrates 13 and 15 are equal to either the ordinary index $n_o$ or the effective index $n_e$ of the liquid crystal 10a and 10b. A power source 31 applies a voltage between the transparent electrodes 9a and 9b and/or between the electrodes 9b and 9c independently, and thereby, the refractive index of the liquid crystal 10a and 10b alters between $n_o$ and $n_e$. With this arrangement, independent phase modulation becomes possible.

On the hologram surfaces 17 and 18, each pixel has a phase of 0 radian or π radian. A beam passing through the two hologram surfaces 17 and 18 is phase-modulated according to the combination of these two phase distributions. Therefore, with the two hologram surfaces 17 and 18, four kinds of phase modulation is possible. However, if a pixel on the hologram surface 17 and the corresponding pixel on the hologram surface 18 both have a phase of 0 radian, the result of the addition is 0 radian, and if mutually corresponding pixels on the hologram surfaces 17 and 18 both have a phase of π radian, the result of the addition is 2π radian, which is the same phase as 0 radian. Also, if a pixel on the hologram surface 17 (or 18) is 0 radian and if the corresponding pixel on the hologram surface 18 (or 17) is π radian, the result of the addition is π radian. Therefore, the beam which passed through these hologram surfaces 17 and 18 has a phase distribution with substantially two values. Thus, with this spatial phase modulation element 2A, a binary-phase hologram can be obtained.

Figure 6:
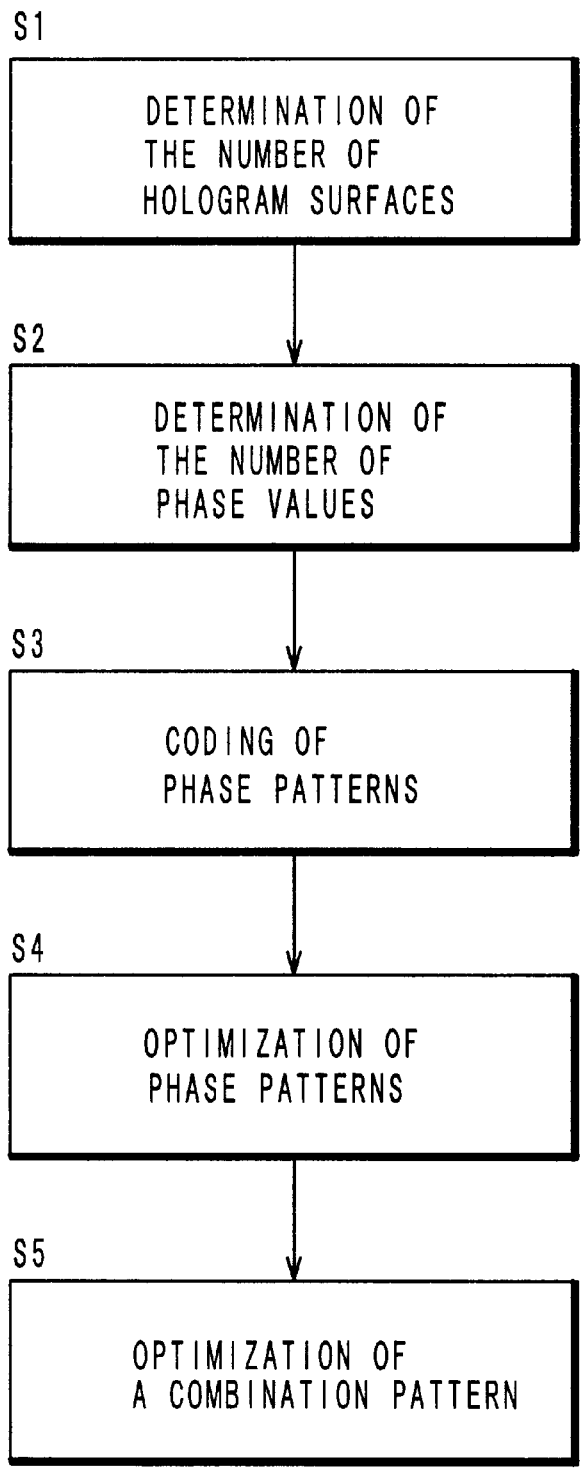
FIG. 6 is a flowchart which shows an exemplary method of designing a spatial phase modulation element according to the present invention.

FIG. 6 shows a flowchart showing an exemplary method of designing a spatial phase modulation element according to the present invention. At step S1, the number of hologram surfaces to be laid one upon another is determined according to the number of desired output patterns. At step S2, the number of phase values (the number of phase grades) is determined according to the shapes of the desired output patterns, and phase patterns are formed. At step S3, each of the phase patterns is converted into a binary digit string to be deemed as a chromosome.

Next, at step S4, each of the phase patterns is optimized independently so that the phase pattern by itself can generate a desired output pattern from a random pattern. At the optimization, genetic manipulations according to the genetic algorithm are applied to the binary digit string. At step S5, optimization of a combination pattern is carried out so that a desired output pattern can be obtained by the integral of the phase patterns (by the combination pattern). While combination is carried out in an initial group of phase patterns including the independently optimized phase patterns, the independently optimized phase patterns are optimized so that all the desired output patterns can be obtained. Since each of the independently optimized phase patterns has optimal genes, with the process at step S5, all the phase patterns are optimized without putting each of the independent phase patterns far from its optimal solution.

In the present embodiment, a hologram is designed according to a two-value phase function. A phase hologram with a sub-cell composed 32×32 pixels is formed as a chromosome which is a binary digit string with a length of 1024. Every gene has a phase value of either 0 or π. First, a group of random chromosomes is generated, and each phase hologram is subjected to two-dimensional Fourier transform so that the intensity of light on a Fourier surface can be figured out. The difference between the result and the desired output pattern is deemed as fitness, and the phase hologram is evolved by the technique of genetic algorithm so that the optimal solution with the minimum difference can be obtained. As FIGS. 9 through 11 show, phase optimization is carried out so that the combination of an output pattern caused by the hologram surface 17 by itself with an output pattern caused by the hologram surface 18 by itself can be formed when the hologram surfaces 17 and 18 operate simultaneously.

More specifically, a phase distribution which is formed by the combination of the two-dimensional phase distribution of the hologram surface 17 with the two-dimensional phase distribution of the hologram surface 18 is figured out. By subjecting the figured-out phase distribution to Fourier transform, an output pattern by the combination of the hologram surfaces 17 and 18 is obtained. While constraining conditions to make this output pattern into a desired shape are given, the phase patterns 12 and 14 are optimized simultaneously according to the genetic algorithm.

In such a case of designing a hologram surface with two phase values (ordinarily 0 and π), freedom of design is restraint, and possible output patterns are limited to symmetric ones. However, this has an advantage of having a simple structure, thereby easy to be produced.

Also, the following way is possible: after independent design of the phase patterns 12 and 14, the tolerable range of the optimal solutions of the phase patterns 12 and 14 is limited; and the combination pattern is designed within the limited range. Further, in the examples below, N=2.

Example 1

FIG. 7 shows the phase pattern 12 of one of the sub-cells composing the hologram surface 17 of the spatial phase modulation element 2A which is designed according to the first example, and FIG. 8 shows the phase pattern 14 of one of the sub-cells composing the hologram surface 18 of the element 2A. In FIGS. 7 and 8, white portions have a phase of π radian, and black portions have a phase of 0 radian. Patterns with inverted black and white portions respectively from the phase patterns 12 and 14 are in phase conjugation with the patterns 12 and 14, respectively. The patterns which are mutually in phase conjugation cause the same output pattern.

FIGS. 9 and 10 show output patterns which are formed on the focal point when only the hologram 17 operates and when only the hologram 18 operates, respectively. The hologram 17 is designed to form a pattern of a square by itself, and the hologram 18 is designed to form a pattern of a cross by itself. FIG. 11 shows an output pattern which is formed on the focal point when the hologram surfaces 17 and 18 operate simultaneously.

Figure 12:
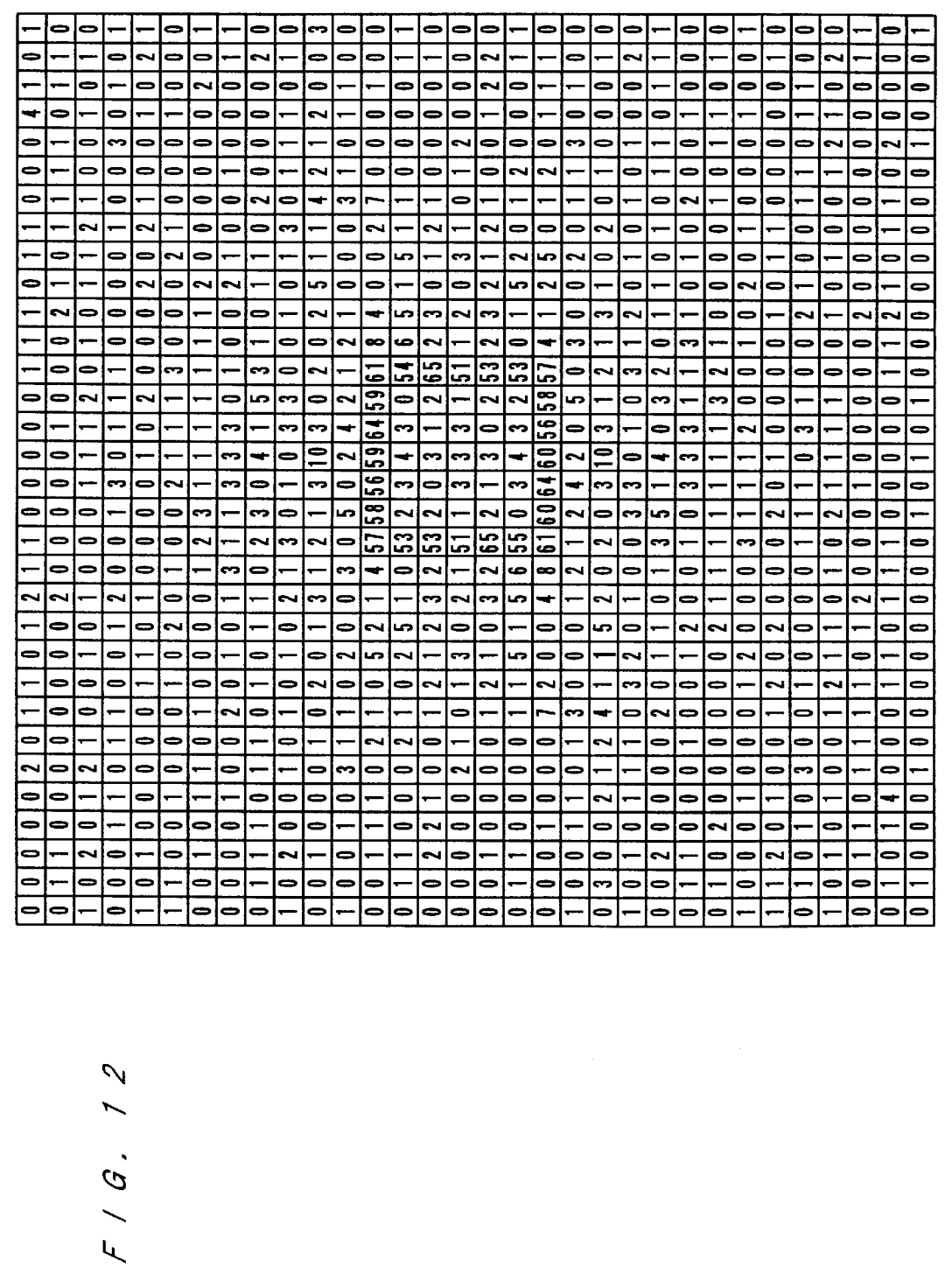
Figure 13:
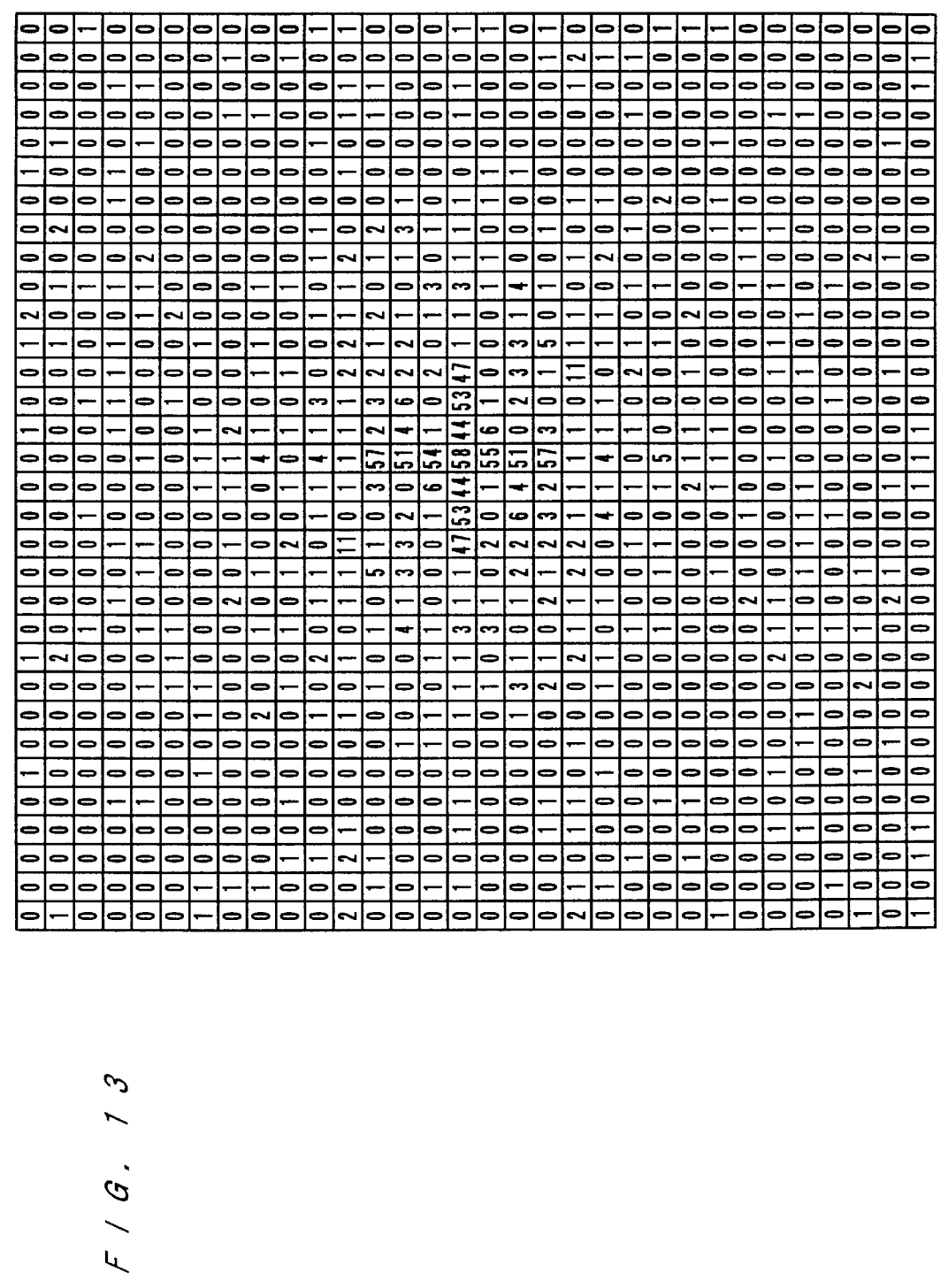
Figure 14:
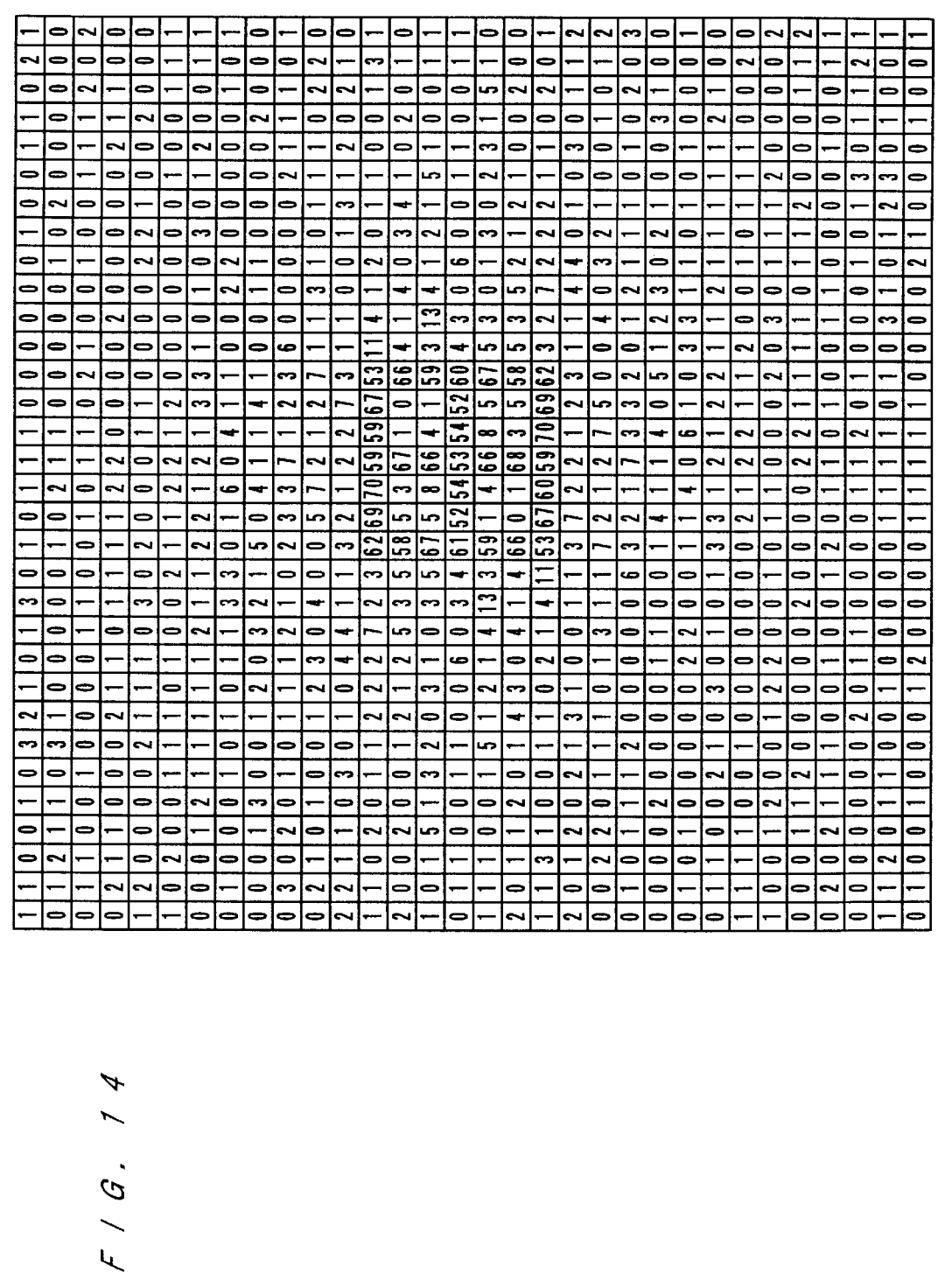

FIGS. 12 and 13 show data values of the output patterns which are formed on the focal point when only the hologram surface 17 operates and when only the hologram surface 18 operates, respectively. FIG. 14 shows data values of the output pattern which is formed on the focal point when the hologram surfaces 17 and 18 operate simultaneously. The output patterns are formed according to the data values. However, because of the signal-to-noise ratio, actually the output patterns shown by FIGS. 9 through 11 are formed.

Example 2

FIGS. 15 and 16 show the second example of the phase patterns 12 and 14 of one of the sub-cells, respectively.

FIGS. 17 and 18 show output patterns which are formed on the focal point when only the hologram surface 17 operates and when only the hologram surface 18 operates, respectively. The hologram 17 is designed to form a 4×4 fan-out with no patterns in the center, and the hologram 18 is designed to form a 2×2 fan-out with no patterns in the periphery. FIG. 19 shows an output pattern which is formed on the focal point when the hologram surfaces 17 and 18 operate simultaneously. As in the first example, the phase patterns 12 and 14 are optimized so that a pattern which is the combination of the output pattern formed by the hologram surface 17 with the output pattern formed by the hologram surface 18 can be formed when the hologram surfaces 17 and 18 operate simultaneously, and consequently, a 4×4 fan-out can be obtained.

Figure 20:
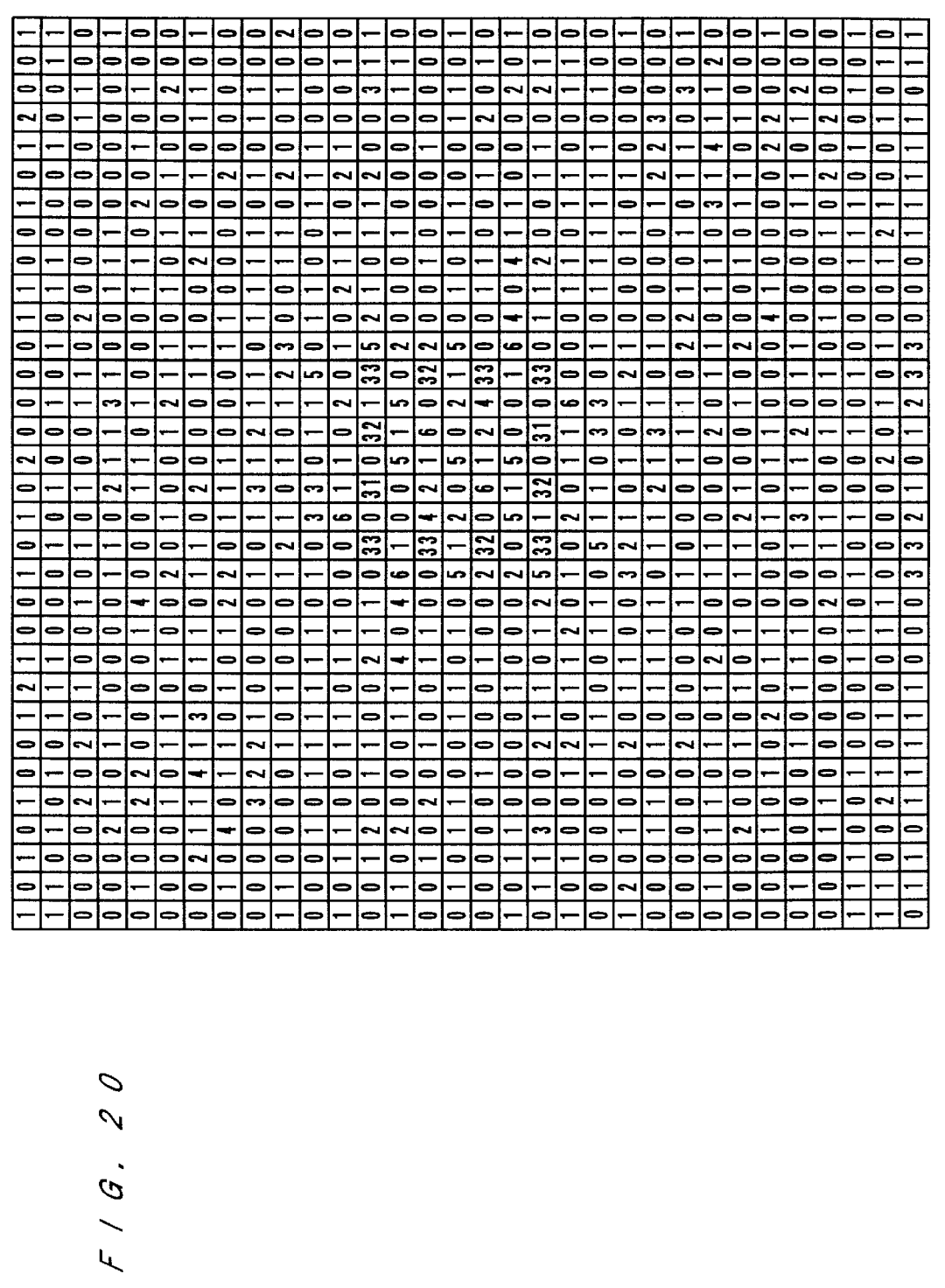
Figure 21:
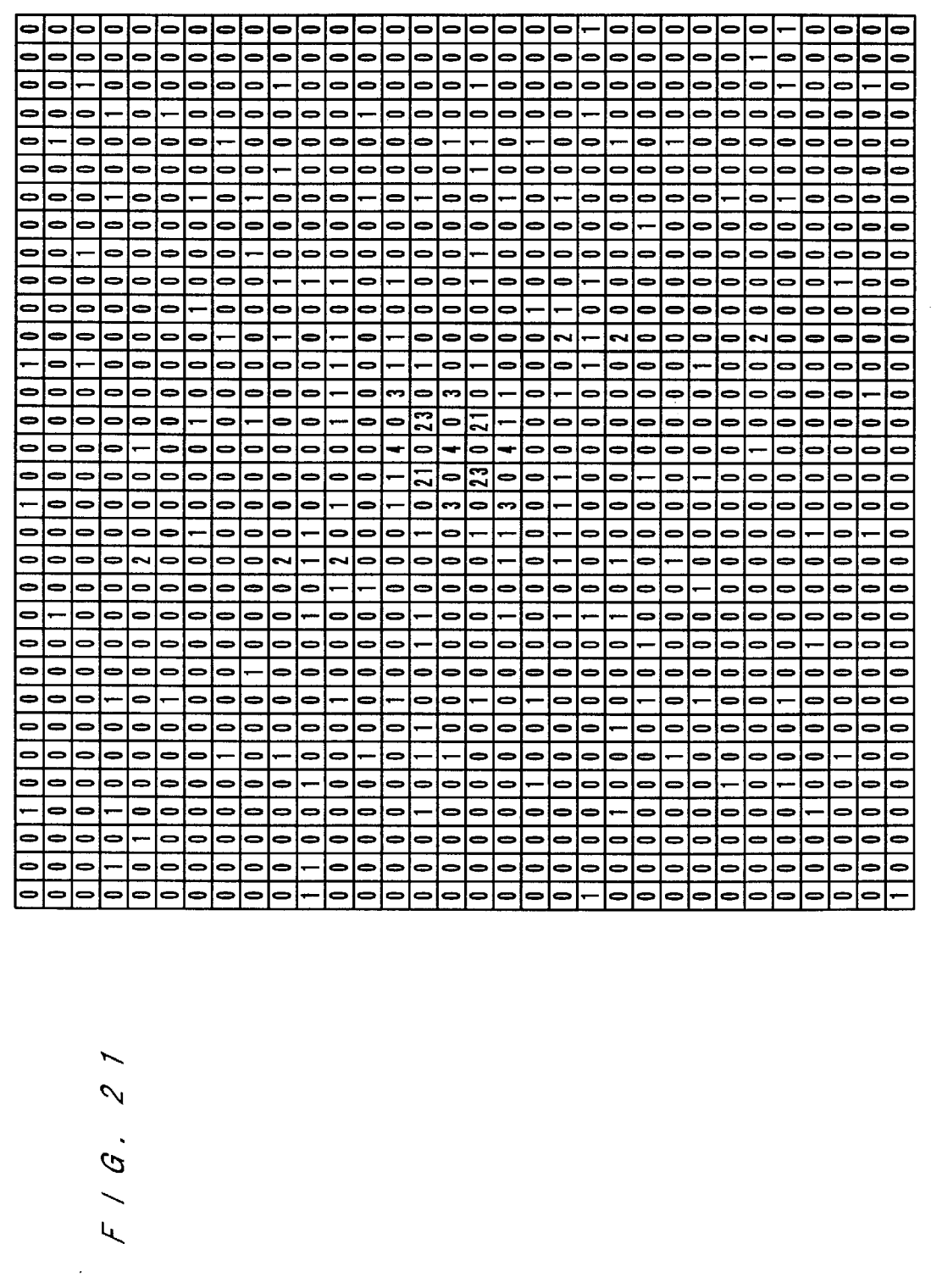
Figure 22:
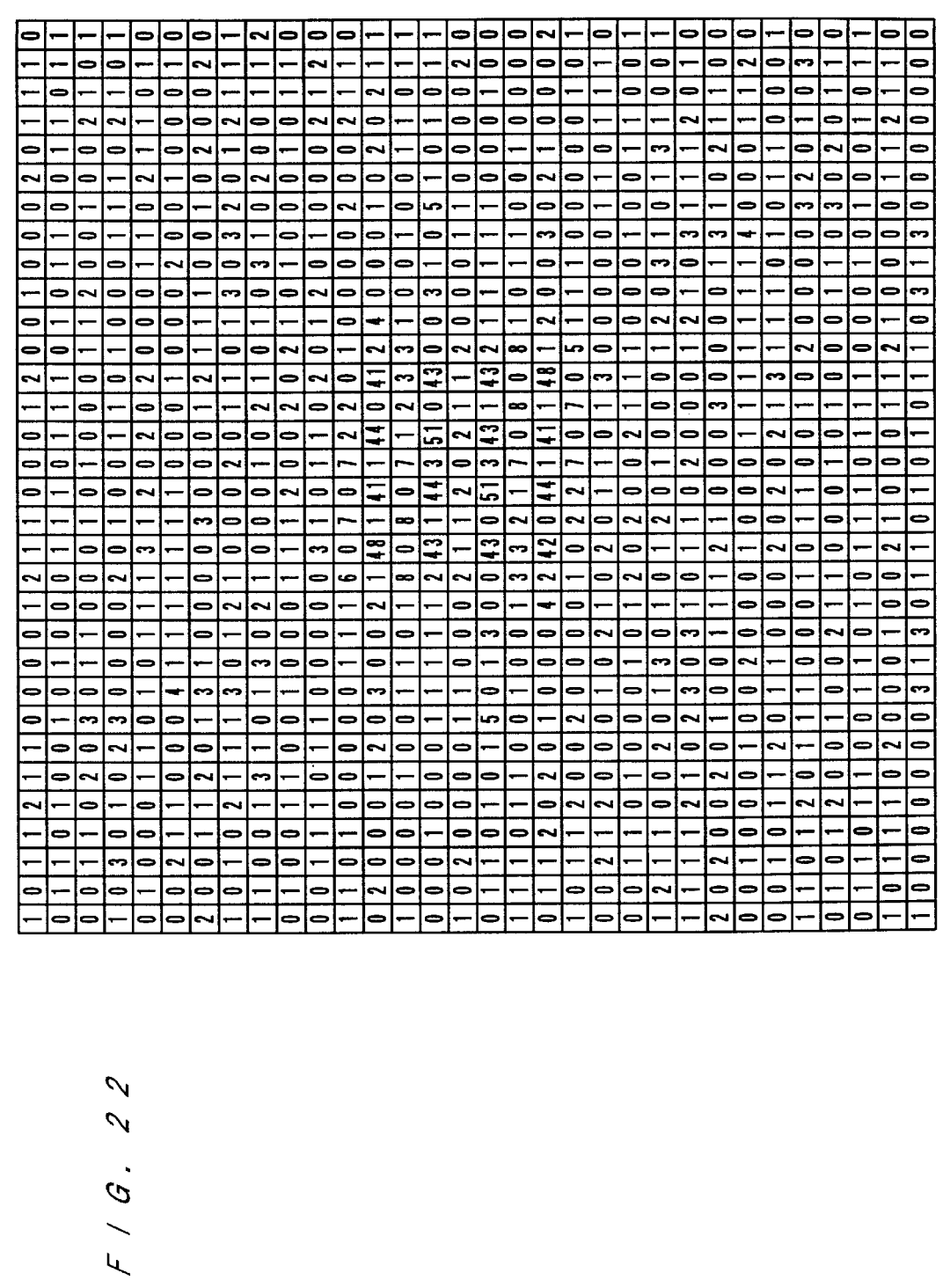

FIGS. 20 and 21 show data values of the output patterns which are formed on the focal point when only the hologram surface 17 operates and when only the hologram surface 18 operates, respectively. FIG. 22 shows data values of the output pattern which is formed on the focal point when the hologram surfaces 17 and 18 operate simultaneously.

Example 3

FIGS. 23 and 24 show the third example of the phase patterns 12 and 14 of one of the sub-cells.

Figure 25:
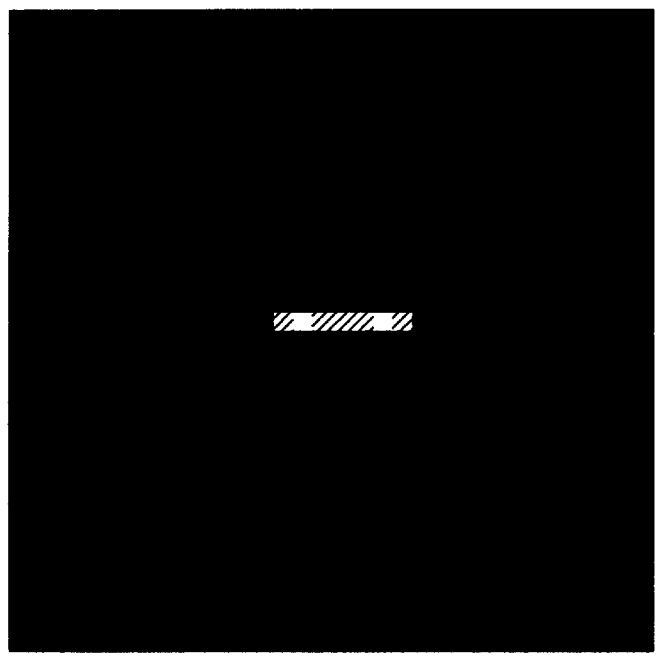
FIG. 25 is a plan view of an output pattern when only the hologram surface with the first phase pattern shown by FIG. 23 operates.
Figure 26:
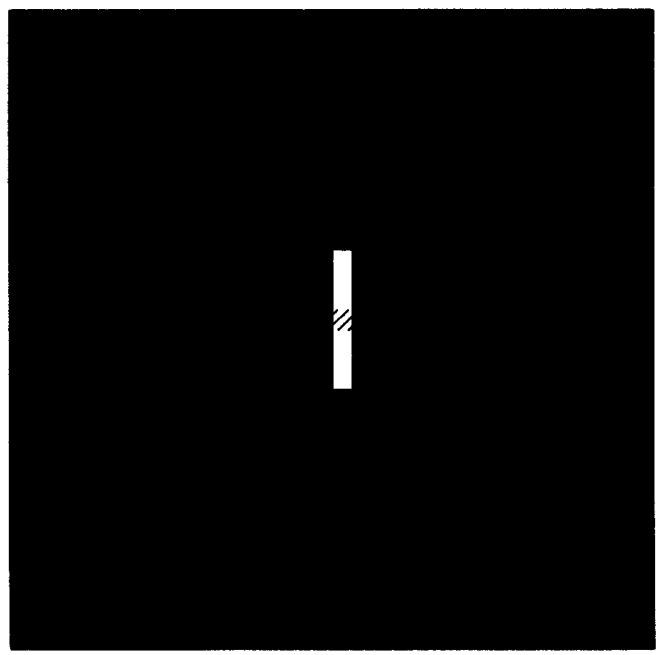
FIG. 26 is a plan view of an output pattern when only the hologram surface with the second phase pattern shown by FIG. 24 operates.
Figure 27:
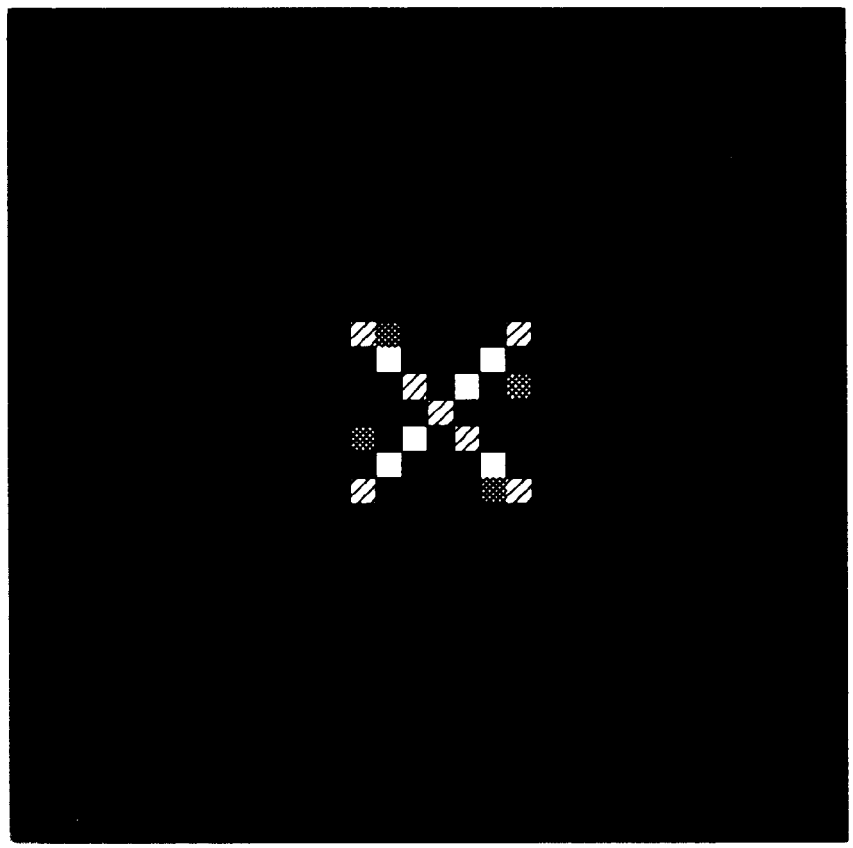
FIG. 27 is a plan view of an output pattern when both the hologram surfaces with the first phase pattern shown by FIG. 23 and with the second phase pattern shown by FIG. 24 respectively operate.

FIGS. 25 and 26 show output patterns which are formed on the focal point when only the hologram surface 17 operates and when only the hologram surface 18 operates, respectively. The hologram 17 is designed to form a horizontal line, and the hologram 18 is designed to form a vertical line. FIG. 27 shows an output pattern which is formed on the focal point when the hologram surfaces 17 and 18 operate simultaneously. In the third example, the phase patterns 12 and 14 are optimized so that a new output pattern which is not the combination of the output pattern formed by the hologram surface 17 with the output pattern formed by the hologram surface 18 can be formed when the hologram surface 17 and 18 operate simultaneously.

Figure 28:
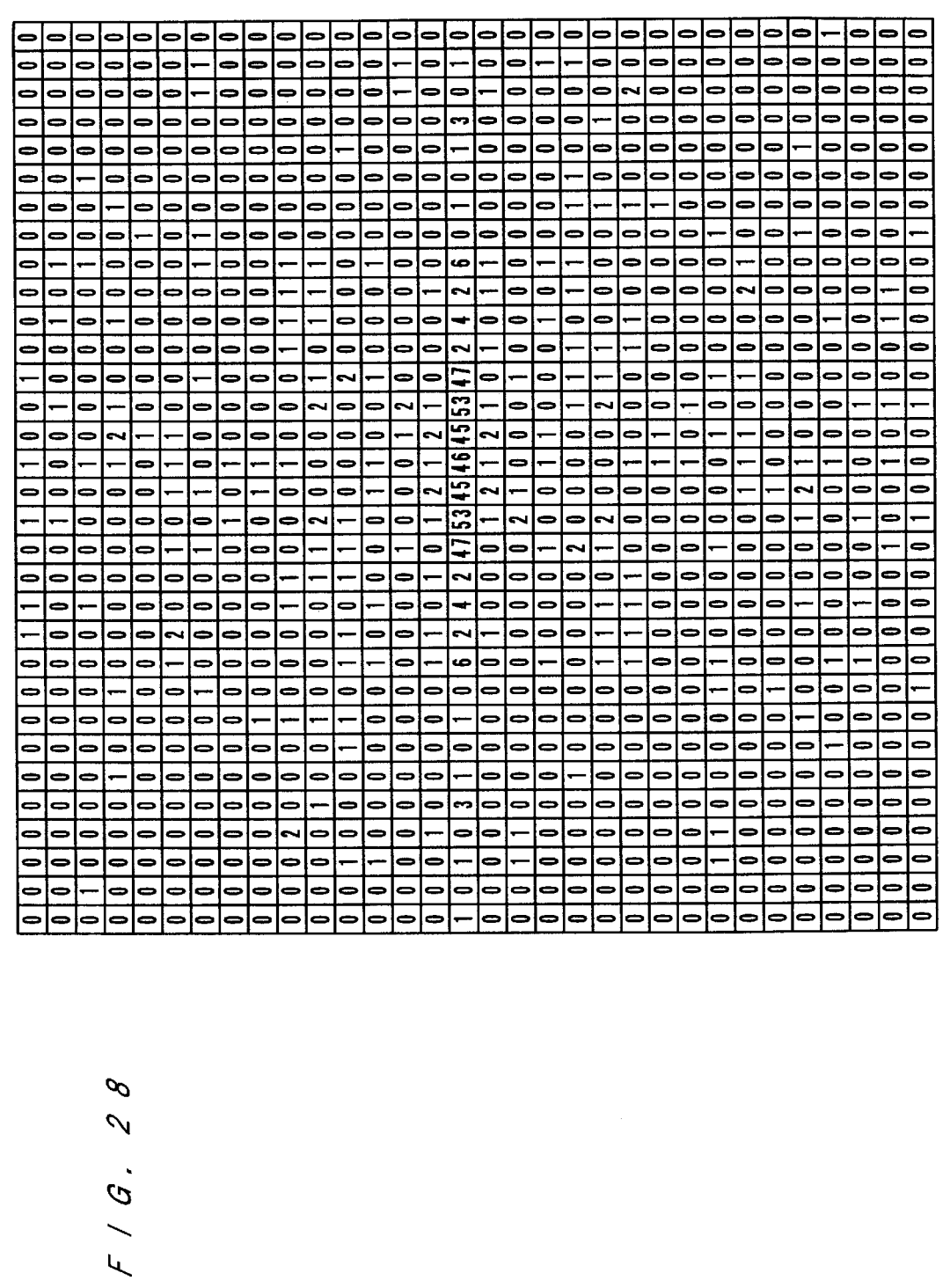
Figure 29:
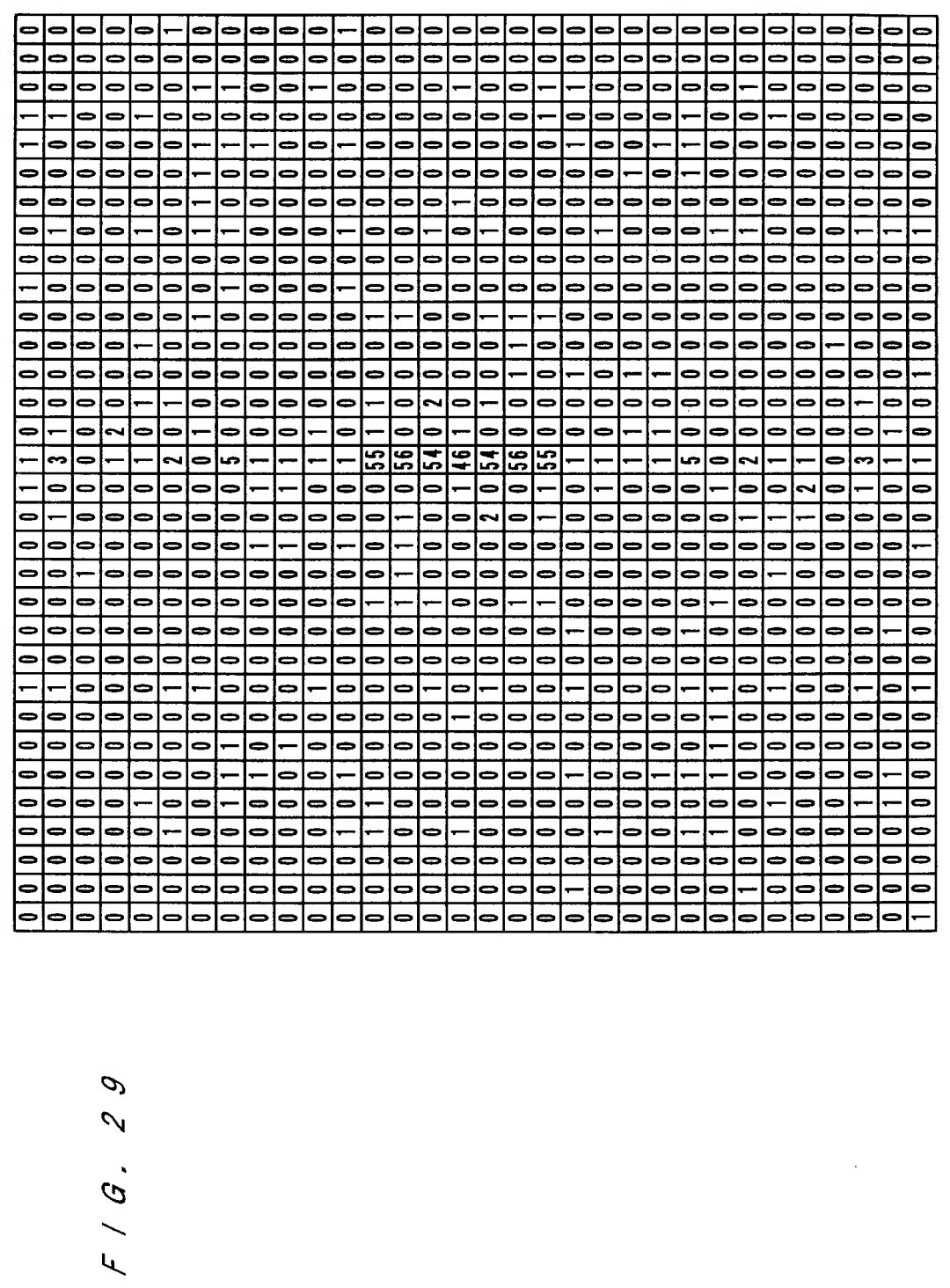
Figure 30:
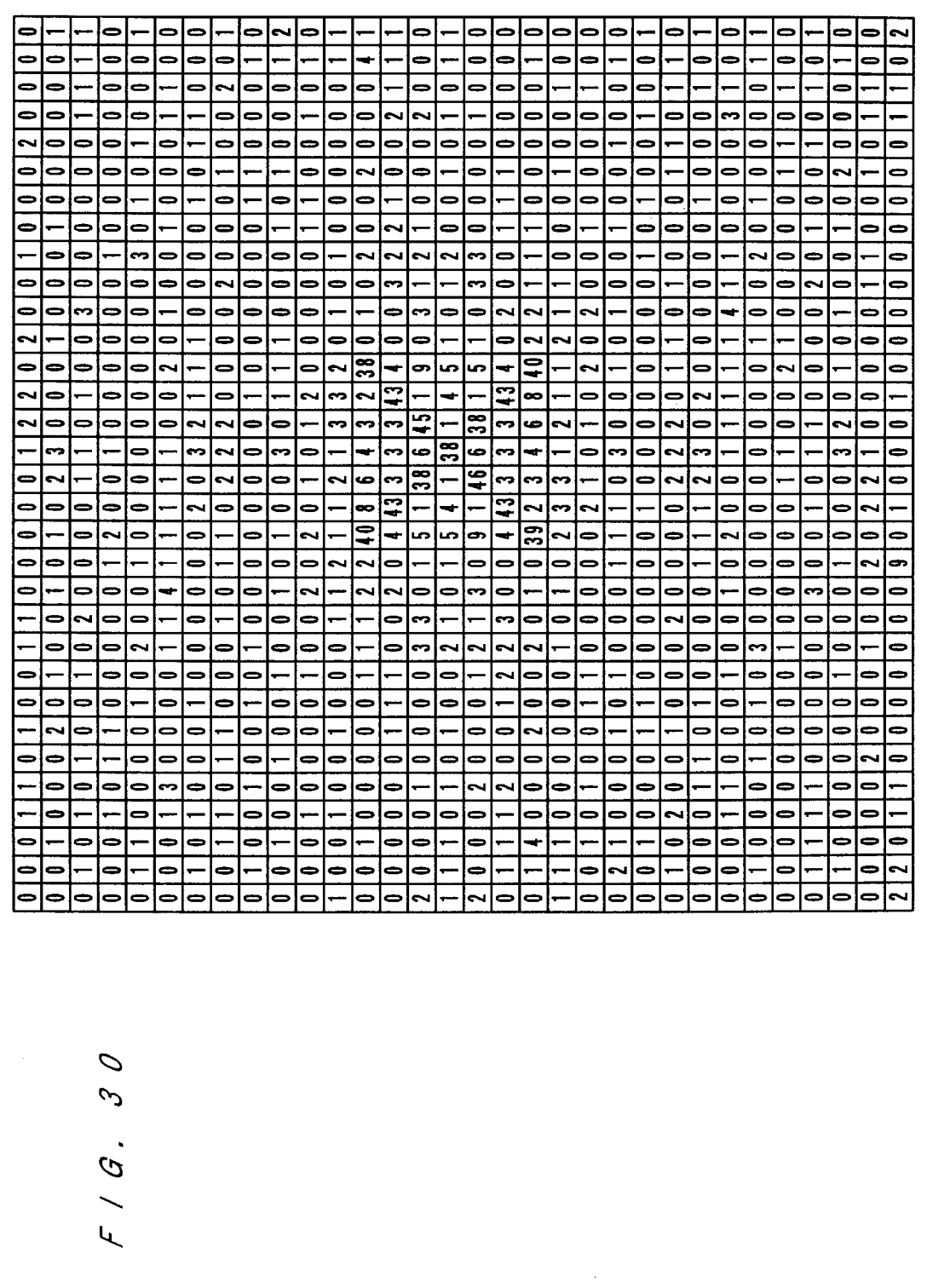

FIGS. 28 and 29 show data values of the output patterns formed only by the hologram surface 17 and formed only by the hologram surface 18, respectively. FIG. 30 shows data values of the output pattern which is formed when the hologram surfaces 17 and 18 operate simultaneously.

For comparison, FIG. 31 shows an output pattern which is obtained by combination of the phase pattern 12 of the hologram surface 17 with the phase pattern 14 of the hologram surface 18 when the phase patterns 12 and 14 are designed and independently optimized to form a horizontal line and a vertical line, respectively. In this case, energy concentration is seen in the center, and the desired output pattern cannot be obtained.

As is apparent from the above three examples, basically, hologram surfaces can be designed to form any output patterns. The shapes of the output patterns are determined in consideration for the balance with the final performance.

Although N=2 in the examples above, there is no limitation on the algorithm for design, and N may be three or more. Also, it is possible to form $2^N$ (N is the number of hologram surfaces) output patterns. For example, if N=3, eight output patterns are possible. However, one of the eight output patterns is the same as an input pattern, and the number of possible new output patterns is seven.

Further, hologram surfaces do not have to be of a type which transmits a laser beam as described in the above embodiment. For example, a hologram surface which reflects a laser beam can be formed by using reflective liquid crystal, DMD (digital mirror device (manufactured by Texas Instruments Co.)) or the like as the variable-phase medium. It is also possible to combine a light-transmitting type hologram surface with a light-reflecting type hologram surface. Moreover, when a plurality of hologram surfaces are laid one upon another, transparent electrodes and glass covers must be put among the hologram surfaces, and it is necessary to consider the thicknesses of these parts. In the above embodiment, the optimization is carried out with the transparent electrodes and the glass covers regarded to have no thickness virtually, but it is easy to consider this factor, and it has no influence on the design algorithm.

Although in the present embodiment, all the phase distributions are binary (with values of 0 and π), the phase distributions may be multi-value (four-value, six-value, eight-value, sixteen-value or the like) ones or analog ones. In such cases, the hologram surfaces can be designed more freely, and the diffraction efficiency and other performances can be improved.

Also, the computer hologram surfaces may be composed of pixels with superficial relieves made of binary optical elements or may be composed of pixels with analog superficial relieves.

As for formation of hologram surfaces on substrates like the hologram surfaces 17 and 18 in the present embodiment, it is possible to form a hologram surface on glass or on resist by recent fine processing techniques such as electronic beam exposure, laser drawing, mask exposure, anisotropic etching, etc. Further, mass production is possible by making a mold based on a drawing and carrying out plastic molding or glass molding.

Although the present invention has been described in connection with the preferred embodiment, it is to be noted that various changes and modifications are possible to those who are skilled in the art. Such changes and modifications are to be noted as being within the scope of the present invention.

What is claimed is:

1. A method of designing a spatial phase modulation element, the method comprising the steps of:

designing a plurality of hologram surfaces with mutually different phase patterns;

designing a variable-phase medium to be located on one side of each of the hologram surfaces; and designing modulating means for modulating the phase patterns of the hologram surfaces independently of each other;

wherein the following condition is fulfilled when the modulating means is operated:

$n \geq N+2$ $N \geq 2$ wherein, n is the number of possible output patterns obtained with the spatial phase modulation element, and N is the number of hologram surfaces.

2. A method of designing a spatial phase modulation element as claimed in claim 1, the method further comprising:

a first step of designing and optimizing phase patterns independently to achieve desired output patterns; and a second step of designing and optimizing a combination pattern by combining the phase patterns optimized in the first step.

3. A method of designing a spatial phase modulation element as claimed in claim 1, wherein the variable-phase medium is a variable-index medium.

4. A method of designing a spatial phase modulation element as claimed in claim 1, wherein a nonvariable-phase medium is located on the other side of each of the hologram surfaces.

5. A method of designing a spatial phase modulation element as claimed in claim 2, wherein in the first step, each of independently designed phase patterns is coded into a binary digit string, and the binary digit string is optimized by applying genetic manipulations to a group of chromosomes.

6. A method of designing a spatial phase modulation element as claimed in claim 5, wherein in the second step, a combination pattern is designed and optimized by applying genetic manipulations to a group of phase patterns while substantially keeping the genetic structures of the phase patterns optimized at the first step.

7. A method of designing a spatial phase modulation element, the method comprising the steps of:

determining the number of hologram surfaces according to the number of desired output patterns obtained with the spatial phase modulation element;

determining the number of phase values according to the shapes of the desired output patterns and forming phase patterns;

coding each of the phase patterns into a binary digit string;

optimizing the coded phase patterns independently of each other; and forming a combination pattern by combining the independently optimized phase patterns and optimizing the combination pattern.

8. A method of designing a spatial phase modulation element as claimed in claim 7, wherein each of the coded phase patterns is optimized by applying genetic manipulations to a group of chromosomes.

9. A method of designing a spatial phase modulation element as claimed in claim 8, wherein the combination pattern is optimized by applying genetic manipulations to a group of phase patterns while substantially keeping the genetic structures of the independently optimized phase patterns.

10. A spatial phase modulation element comprising:

a plurality of hologram surfaces with mutually different phase patterns;

a variable-phase medium which is located on one side of each of the hologram surfaces; and modulating means for modulating the phase patterns of the hologram surfaces independently of each other;

wherein the following condition is fulfilled:

$n \geq N+2$ $N \geq 2$ wherein n is the number of possible output patterns obtained with the spatial phase modulation element, and N is the number of hologram surfaces.

11. A spatial phase modulation element as claimed in claim 10, wherein the hologram surfaces are so designed that each of the hologram surfaces is to achieve a desired output pattern by itself and that a combination of at least two of the hologram surfaces is to achieve a desired output pattern.

12. A spatial phase modulation element as claimed in claim 10, wherein the variable-phase medium is a variable-index medium.

13. A spatial phase modulation element as claimed in claim 10, wherein a nonvariable-phase medium is located on the other side of each of the hologram surfaces.

14. A spatial phase modulation element which is produced in a method comprising the steps of:

determining the number of hologram surfaces according to the number of desired output patterns obtained with the spatial phase modulation element;

determining the number of phase values according to the shapes of the desired output patterns and forming respective phase patterns respectively for the hologram surfaces;

coding each of the phase patterns into a binary digit string;

optimizing the coded phase patterns independently of each other; and forming a combination pattern by combining the independently optimized phase patterns and optimizing the combination pattern.

* * * * *

UNITED STATES PATENT AND TRADEMARK OFFICE
CERTIFICATE OF CORRECTION

| | |
|---|---|
| PATENT NO. | : 6,023,353 |
| APPLICATION NO. | : 09/181516 |
| DATED | : February 8, 2000 |
| INVENTOR(S) | : Yuichiro Ori |

It is certified that error appears in the above-identified patent and that said Letters Patent is hereby corrected as shown below:

Column 1, line 24, delete "diving", and insert --dividing--.

Column 1, line 66, delete "more", and insert --further--.

Column 6, line 23, delete "liquid crystal", and insert --phase modulation medium (liquid crystal)--.

Column 6, line 30, delete "liquid crystal", and insert --phase modulation medium (liquid crystal)--.

Column 6, line 41, delete "liquid crystal", and insert --phase modulation medium (liquid crystal)--.

Column 6, lines 41-42, delete "liquid crystal", and insert --phase modulation medium (liquid crystal)--.

Column 6, line 42, delete "liquid crystal", and insert --phase modulation medium (liquid crystal)--.

Column 6, line 43, delete "liquid crystal", and insert --phase modulation medium (liquid crystal)--.

Column 6, line 46, delete "liquid crystal", and insert --phase modulation medium (liquid crystal)--.

Column 6, line 49, delete "liquid crystal", and insert --phase modulation medium (liquid crystal)--.

Column 7, line 60, delete "restraint", and insert --restrained--.

Column 9, line 57, delete "relieves", and insert --reliefs--.

UNITED STATES PATENT AND TRADEMARK OFFICE
CERTIFICATE OF CORRECTION

PATENT NO.       : 6,023,353
APPLICATION NO.  : 09/181516
DATED            : February 8, 2000
INVENTOR(S)      : Yuichiro Ori It is certified that error appears in the above-identified patent and that said Letters Patent is hereby corrected as shown below:

Column 9, line 59, delete "relieves", and insert --reliefs--.

Column 10, line 24 (claim 1, line 17), delete "the", and insert --a--.

Column 10, line 26 (claim 1, line 19), delete "the", and insert --a--.

Column 10, line 40 (claim 4, line 3), delete "the other", and insert --another--.

Column 10, line 55 (claim 7, line 3), delete "the", and insert --a--.

Column 10, line 56 (claim 7, line 4), delete "the", and insert --a--.

Column 10, line 56 (claim 7, line 4), delete "desired".

Column 10, line 56 (claim 7, line 4), before "obtained", insert --desired to be--.

Column 10, line 58 (claim 7, line 6), delete the first instance of "the", and insert --a--.

Column 10, line 58 (claim 7, line 6), delete the second instance of "the".

Column 10, line 60 (claim 7, line 8), after "patterns", insert --based on said number of phase values--.

Column 11, line 8 (claim 9, line 4), delete "the".

Column 11, line 24 (claim 10, line 14), delete "the", and insert --a--.

Column 11, line 26 (claim 10, line 16), delete "the", and insert --a--.

Column 12, line 1 (claim 11, line 3), before "to achieve", insert --adapted--.

Column 12, line 3 (claim 11, line 5), before "to achieve", insert --adapted--.

Column 12, line 9 (claim 13, line 3), delete "the other", and insert --another--.

Column 12, line 12 (claim 14, line 3), delete "the", and insert --a--.

UNITED STATES PATENT AND TRADEMARK OFFICE
CERTIFICATE OF CORRECTION

PATENT NO. : 6,023,353
APPLICATION NO. : 09/181516
DATED : February 8, 2000
INVENTOR(S) : Yuichiro Ori Page 3 of 3

It is certified that error appears in the above-identified patent and that said Letters Patent is hereby corrected as shown below:

Column 12, line 13 (claim 14, line 4), delete "the", and insert --a--.

Column 12, line 13 (claim 14, line 4), delete "desired".

Column 12, line 13 (claim 14, line 4), before "obtained", insert --desired to be--.

Column 12, line 16 (claim 14, line 6), delete the first instance of "the", and insert --a--.

Column 12, line 16 (claim 14, line 6), delete the second instance of "the".

Signed and Sealed this

First Day of May, 2007

JON W. DUDAS
*Director of the United States Patent and Trademark Office*